United States Patent [19]

Hennig

[11] 4,018,411
[45] Apr. 19, 1977

[54] POWER FEED CHAIN

[76] Inventor: Kurt Hennig, Georgensteinstr. 16, 8 Munich 71, Germany

[22] Filed: Mar. 31, 1975

[21] Appl. No.: 563,589

Related U.S. Application Data

[62] Division of Ser. No. 422,206, Dec. 6, 1973, abandoned.

[30] Foreign Application Priority Data

Dec. 19, 1972 Germany .......................... 2262018
Sept. 20, 1973 Germany .......................... 2347383

[52] U.S. Cl. .................................. 248/49; 59/78.1; 248/51; 248/68 R
[51] Int. Cl.² .......................................... F16L 3/16
[58] Field of Search .................... 59/78.1; 191/12 C; 248/49, 51, 68 CB, 68 R, 67.7, 225, 89, 91, 92

[56] References Cited

UNITED STATES PATENTS

| | | | |
|---|---|---|---|
| 2,348,096 | 5/1944 | Schack | 248/68 CB |
| 2,634,475 | 4/1953 | Browne | 24/135 M |
| 2,938,692 | 5/1960 | Bosworth et al. | 248/68 R |
| 3,382,668 | 5/1968 | Berkes et al. | 248/51 X |
| 3,716,986 | 2/1973 | Cork et al. | 59/78.1 |
| 3,848,407 | 11/1974 | Moritz | 59/78.1 |
| 3,881,314 | 5/1975 | Hennig et al. | 248/51 X |

FOREIGN PATENTS OR APPLICATIONS

| | | | |
|---|---|---|---|
| 479,024 | 7/1929 | Germany | 248/68 R |
| 1,142,149 | 2/1969 | United Kingdom | 248/51 |

Primary Examiner—Roy D. Frazier
Assistant Examiner—Rodney H. Bonck
Attorney, Agent, or Firm—Marshall & Yeasting

[57] ABSTRACT

A power feed chain has two chain bands and a plurality of connecting struts. The strut construction resists twisting, so as to hold the two chain bands parallel to one another and in longitudinal alignment. It is in the form of a lightweight but rigid grid, comprising two cross-ties consisting of strips of flat material arranged in parallel planes, and a plurality of spacers of flat material which extend between the cross-ties and are arranged in parallel planes that are perpendicular to the planes of the cross-ties. Each spacer has in each of its long sides a relatively deep notch which has parallel sides and which fits around one of the flat cross-ties, so that the spacers and cross-ties form a rigid torsion-resistant grid frame.

1 Claim, 2 Drawing Figures

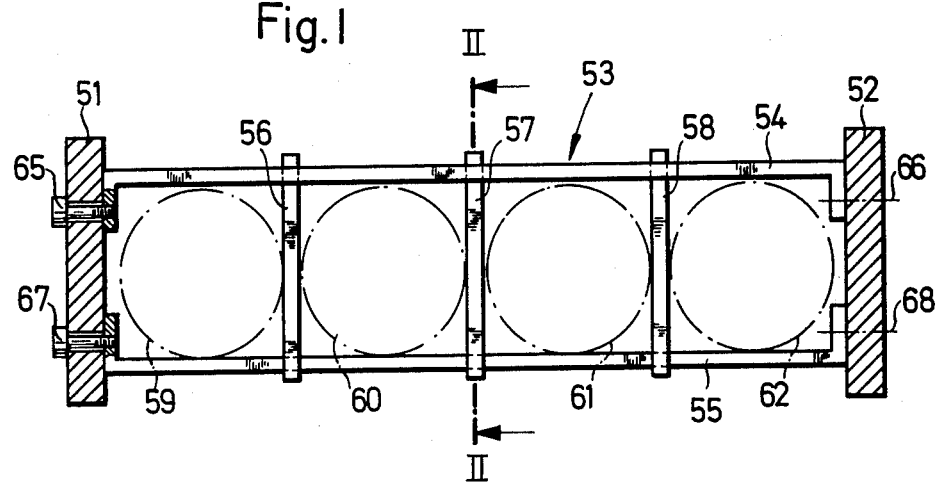
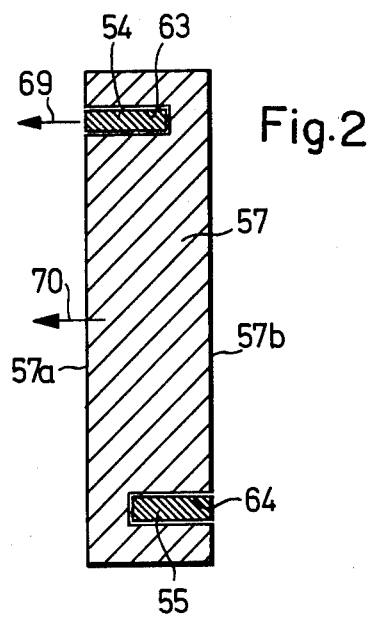

4,018,411

POWER FEED CHAIN

CROSS-REFERENCE TO RELATED APPLICATION

This is a division of application Ser. No. 422,206, filed Dec. 6, 1973 and now abandoned.

BACKGROUND OF THE INVENTION

This invention relates to a power feed chain with two chain bands and interposed connecting struts each consisting of at least two cross-ties, and spacers disposed between the cross-ties and used for holding the power feed lines, wherein the spacers are adjustable longitudinally of the cross-ties and at least one cross-tie can be released from the spacers.

In a known power feed chain, shown in U.S. Pat. No. 3,382,668, the webs connecting the two chain bands are each formed of two cross-ties with intermediate "spectacle" members provided with bores to receive the power feed lines. In this case the spectacle members are aligned immediately adjacent each other, so that their mutual spacing cannot be altered. If one power feed line has to be replaced by another line of different diameter, with this known power feed chain complicated assembly operations are needed, since the spectacle members cannot readily be adapted to different diameters. Another disadvantage of this known construction is that the machining of the spectacle members causes high production costs.

A power feed chain is also described in British Pat. No. 1,142,149 wherein each spacer has two recesses for holding the cross-ties. One recess is formed as a round hole through which the corresponding cross-tie thus has to be threaded. The other recess is open towards the one narrow side of the spacer, so that the corresponding cross-tie can be freely inserted and removed. This construction does in fact thus permit ready changing of the power feed lines and adaptation to different diameters by moving the spacer on the cross-ties, formed as round rods. However a very serious disadvantage of this known construction is the completely inadequate stability and stiffness of the connecting struts, which has its cause especially in the poor bracing of the cross-ties, passed through the open recesses, with the spacers and with the other cross-tie.

SUMMARY OF THE INVENTION

The invention is thus directed to the problem of providing a power feed chain of the type hereinbefore described, which avoids the defects of the known constructions in that firstly the power feed lines can be changed without excessive assembly work, with the connecting struts adjustable to different line diameters, and secondly a particularly stable construction, resistant to twisting and bending is achieved for the connecting struts, while manufacture is also simplified and hence cheapened.

According to the invention the spacers are so connected to the cross-ties in the assembled position that they determine the spacing of the two cross-ties, and together with these cross-ties form a rigid grid frame.

For this purpose in accordance with the invention, each spacer has in the vicinity of its two ends two recesses for receiving the two cross-ties, at least one of said recesses being externally open, the shape and disposition of this open recess being so chosen that the cross-tie engaging in this recess can in general be released by a movement transverse to the longitudinal axis of the cross-tie, and when the cross-ties are assembled the spacers determine the interval between the cross-ties while forming a rigid grid frame.

Since in the power feed chain of the invention the spacers and the cross-ties form a grid frame, i.e. a type of bridge structure, excellent torsion and bend stiffness can be achieved with a relatively low amount of material. Changing of the power feed line and adaption of the spacers to the particular dimeter of the power feed line present no difficulties with the power feed chain of the invention.

BRIEF DESCRIPTION OF THE DRAWINGS

FIG. 1 is a cross-section through a power feed chain in accordance with the invention;

FIG. 2 is a section on the line II—II of FIG. 1.

DESCRIPTION OF THE PREFERRED EMBODIMENT

The power feed chain shown in FIGS. 1–2 has two chain bands 51, 52 with spaced-apart connecting struts 53 disposed therebetween. The connecting struts 53 each include two cross-ties 54, 55 along with a number of spacers 56, 57, 58 which hold the power-feed lines 59–62 in the transverse direction.

As may readily be seen from the drawings and description, a connecting strut in a power feed chain as per the invention may be adapted in a very simple manner to power feed lines of differing diameters. For this purpose only the spacers concerned, e.g. 56 and 57, need be moved.

In the embodiment shown the spacers, e.g. 57, have in the vicinity of each end a recess 63, 64 wherein engage the cross-ties 54, 55. As FIG. 2 shows, the two recesses 63, 64 are open towards opposite long sides 57a, 57b of the spacer 57.

The cross-ties 54, 55 are releasably connected by screwed bolts 65, 66 and 67, 68 to the two chain bands 51, 52. If for instance the bolts 65 and 66 are loosened, the cross-tie 54 can be withdrawn from the recesses 63 in spacers 56, 57, 58 in the direction of arrow 69 (FIG. 2), i.e. transversely to the longitudinal axis of the cross-tie. The power feed lines 59–62 can then easily be replaced. If necessary individual spacers (e.g. 57) can then also be removed, by pulling them in the direction of arrow 70 (FIG. 2). One of the two cross-ties can also be permanently affixed to the two chain bands, for instance by using spot welded joints instead of the bolts 65 and 66 (or 67 and 68).

In the assembled position shown in FIGS. 1 and 2, the spacers 56, 57, 58 determine the distance apart of the two cross-ties 54, 55. The spacers 56, 57, 58 are secured both against movement longitudinally of the chain and against tilting movement. Consequently the cross-ties 54, 55 and the spacers 56, 57, 58 form a rigid frame-like bridge structure, giving the connecting strut extremely high stiffness and stability.

In this embodiment both the cross-ties and the spacers may be made of metal or of plastic, for instance glass-fiber reinforced plastic. The cross-ties and spacers can be made either as flat pieces or as profiled members, with any desired profile.

What I claim is:

1. A strut for connecting two chain bands of a power feed chain, wherein the improvement comprises a lightweight structure which is a rigid bridge and therefore resists twisting so as to hold the two chain bands parallel to one another, said rigid bridge being in the form of a rigid grid comprising two cross-ties consisting of strips of flat material arranged in parallel planes, and a plurality of spacers, each consisting of a strip of flat material, arranged in parallel planes that are perpendicular to the planes of the cross-ties, each of said spacers having two notches to receive the two cross-ties, said notches being formed in opposite sides of the strip and being located adjacent to opposite ends of the strip, and each notch having a depth substantially equal to the width of the cross-tie which is received in the notch, and having parallel sides which fit against the sides of the cross-tie to prevent pivoting of the spacer relative to the cross-tie, thus forming said rigid bridge connecting the chain bands.

* * * * *